(12) United States Patent
Neiger et al.

(10) Patent No.: US 7,581,219 B2
(45) Date of Patent: Aug. 25, 2009

(54) TRANSITIONING BETWEEN VIRTUAL MACHINE MONITOR DOMAINS IN A VIRTUAL MACHINE ENVIRONMENT

(75) Inventors: Gilbert Neiger, Portland, OR (US); Steven M. Bennett, Hillsboro, OR (US); Dion Rodgers, Hillsboro, OR (US); Richard A. Uhlig, Hillsboro, OR (US); Lawrence O. Smith, III, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 416 days.

(21) Appl. No.: 11/095,855

(22) Filed: Mar. 30, 2005

(65) Prior Publication Data

US 2006/0015869 A1 Jan. 19, 2006

Related U.S. Application Data

(63) Continuation-in-part of application No. 10/165,597, filed on Jun. 7, 2002.

(51) Int. Cl.
*G06F 9/455* (2006.01)
*G06F 21/00* (2006.01)
*G06F 9/46* (2006.01)

(52) U.S. Cl. ............... 718/1; 718/100; 718/108; 711/6

(58) Field of Classification Search ............ 718/1, 718/100–108; 711/6
See application file for complete search history.

(56) References Cited

U.S. PATENT DOCUMENTS

| 4,253,145 | A | * | 2/1981 | Goldberg | 703/21 |
| 5,361,375 | A | * | 11/1994 | Ogi | 718/1 |
| 5,488,716 | A | * | 1/1996 | Schneider et al. | 714/10 |
| 5,987,604 | A | | 11/1999 | Edrich | |
| 6,093,213 | A | | 7/2000 | Weber | |
| 6,397,242 | B1 | * | 5/2002 | Devine et al. | 718/1 |
| 6,496,847 | B1 | * | 12/2002 | Bugnion et al. | 718/1 |
| 6,725,289 | B1 | * | 4/2004 | Waldspurger et al. | 710/9 |
| 6,944,699 | B1 | * | 9/2005 | Bugnion et al. | 710/269 |
| 7,191,440 | B2 | * | 3/2007 | Cota-Robles et al. | 718/1 |
| 7,424,709 | B2 | * | 9/2008 | Neiger et al. | 718/1 |
| 2002/0013802 | A1 | * | 1/2002 | Mori et al. | 709/1 |
| 2004/0117539 | A1 | * | 6/2004 | Bennett et al. | 711/6 |

OTHER PUBLICATIONS

Intel Corporation, 1A-64 System Abstraction Layer Specification, Jan. 2000, pp. 1-84.

* cited by examiner

*Primary Examiner*—Lewis A Bullock, Jr.
*Assistant Examiner*—Jennifer N To
(74) *Attorney, Agent, or Firm*—Thomas R. Lane

(57) ABSTRACT

Techniques for handling certain virtualization events occurring within a virtual machine environment. More particularly, at least one embodiment of the invention pertains to handling events related to the sub-operating system mode using a dedicated virtual machine monitor (VMM) called the system management mode VMM (SVMM), which exists in a separate portion of memory from a main virtual machine monitor (MVMM) used to handle virtualization events other than those related to the sub-operating system mode. In at least one embodiment, a technique for initializing and managing transitions to and from the SVMM is disclosed.

8 Claims, 10 Drawing Sheets

| BYTE OFFSET | FIELD |
|---|---|
| 0 | VMM DOMAIN SPECIFIER REVISION IDENTIFIER |
| 4 | GDTR-LIMIT |
| 8 | GDTR-BASE-OFFSET |
| 12 | CS-SELECTOR |
| 16 | EIP-OFFSET |
| 20 | ESP-OFFSET |
| 24 | CR3-OFFSET |

| STATE ELEMENT | ACTION |
|---|---|
| CR0 | PG, NE, ET, MP, AND PE BITS ARE SET TO 1; CD AND NW BITS ARE LEFT UNCHANGED; ALL OTHER BITS ARE CLEARED TO 0. |
| CR3 | VMM DOMAIN SPECIFIER - BASE ADDRESS + CR3-OFFSET FIELD IN VMM DOMAIN SPECIFIER |
| CR4 | PAE, MCE, AND PGE BITS ARE CLEARED, PSE BIT IS SET ALL OTHER BITS ARE UNCHANGED. |
| CS | SELECTOR LOADED FROM CS -SELECTOR FIELD IN VMM DOMAIN SPECIFIER |
| SS, DS, ES, FS, GS | SELECTORS SET TO VALUE OF CS -SELECTOR + 0X0008 |
| TR | UNCHANGED |
| EIP | VMM DOMAIN SPECIFIER -BASE ADDRESS + EIP-OFFSET FIELD IN VMM DOMAIN SPECIFIER |
| ESP | VMM DOMAIN SPECIFIER -BASE ADDRESS + ESP-OFFSET FIELD IN VMM DOMAIN SPECIFIER |
| EFLAGS | FORCED TO 0X00000002 |

FIG. 4

TRANSITIONING BETWEEN VIRTUAL MACHINE MONITOR DOMAINS IN A VIRTUAL MACHINE ENVIRONMENT

CROSS-REFERENCE TO RELATED APPLICATIONS

This application is a continuation-in-part of U.S. patent application Ser. No. 10/165,597 filed on Jun. 7, 2002.

FIELD

The present disclosure relates generally to microprocessor systems, and more specifically to microprocessor systems that may operate in a trusted or secured environment.

BACKGROUND

Processors may operate in several processor operating modes depending upon the immediate requirements of system operation. Generally processors may have a supervisor mode, a user mode, and sometimes other special-purpose modes. Supervisor mode may support the execution of the operating system, and may enable the execution of most instructions, including privileged instructions. Access may be given in supervisor mode to a different address space and peripheral devices. User mode may be restricted to non-privileged instructions when compared with supervisor mode, so that user code may not disrupt system functionality.

It is often the case that commercially released software is not a perfect fit on a particular original equipment manufacturer's (OEM) hardware suite. Due to specification misunderstandings or implementation errors, there may be situations where the software attempts to access hardware in a manner not anticipated or supported by the hardware. A simple example could be where a software program expects to place a value in a register at address x whereas the actual register in the hardware is at different address y. This could cause the system to malfunction or behave unpredictably.

In order to deal with such situations, processors may be designed to support an operating mode having the ability to operate in an operating system transparent or quasi-transparent manner, or in a privilege-level independent manner, for the purpose of executing low-level patches. For the purpose of the present application such a mode may be defined as a "sub-operating system mode". One such mode is the system management mode (SMM). The existence of a sub-operating system mode may have additional system benefits, such as supporting transitions between power states.

To deal with software and hardware mismatches as outlined above, existing sub-operating system mode implementations may have no privilege restrictions or address mapping restrictions.

Sub-operating system modes may be invoked by a dedicated sub-operating system mode interrupt, sometimes generated by system firmware or system hardware, or occurring due to the execution of an instruction. This dedicated sub-operating system mode interrupt is usually designed to be non-maskable in order to respond to the exigencies that required the entry into the mode.

For example, in the case of SMM, the dedicated sub-operating system mode interrupt is called a system management interrupt (SMI). The processor may execute the mode's code in a separate address space. For example, when the mode is SMM, the separate address space allows access to system management random-access memory (SMRAM), which may be made inaccessible to the other operating modes. When entering the mode, the processor saves the context of the interrupted program or task within the separate address space. For example, in SMM the context is saved into SMRAM. During the execution within the mode, normal interrupts may be disabled. Finally, the mode may be exited by means of a resume instruction that may only be executed while executing within the mode.

The increasing number of financial and personal transactions being performed on local or remote computers has given impetus for the establishment of "trusted" or "secured" processing environments. The problem these environments try to solve is that of loss of privacy, or data being corrupted or abused. Users do not want their private data made public. They also do not want their data altered or used in inappropriate transactions. Examples of these include unintentional release of medical records or electronic theft of funds from an on-line bank or other depository. Similarly, content providers seek to protect digital content (for example, music, other audio, video, or other types of data in general) from being copied without authorization.

The existence of a sub-operating system mode, such as SMM, is a design challenge for designers of secure or trusted systems. Transitions to and from the sub-operating system mode can be difficult to handle gracefully, such that protected data remains secure and fault conditions are not generated. Indeed, a sub-operating system mode may have no privilege restrictions or address mapping restrictions and may therefore be incompatible with secure or trusted system architecture. This lack of privilege restrictions or address mapping restrictions often cannot be avoided by attempting to mask such a mode's dedicated interrupts, because these are usually designed to be non-maskable.

BRIEF DESCRIPTION OF THE DRAWINGS

Embodiments and the invention are illustrated by way of example and not limitation in the figures of the accompanying drawings, in which like references indicate similar elements and in which:

FIG. 4 is a table illustrating information stored into processing hardware according to one embodiment of the invention.

DETAILED DESCRIPTION

The following description describes techniques for handling certain virtualization events occurring within a virtual machine environment. More particularly, at least one embodiment of the invention pertains to handling sub-system management interrupt (e.g., SMI) using a dedicated virtual machine monitor (VMM) called the system management mode VMM (SVMM), which, in one embodiment, exists in a separate portion of memory from a main virtual machine monitor (MVMM) used to handle virtualization events other than those related to the sub-operating system mode. In at least one embodiment, a technique for initializing and managing transitions to and from the SVMM is disclosed.

In the following description, numerous specific details such as logic implementations, software module allocation, and details of operation are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation. The invention is disclosed in the form of a microprocessor system. However, the invention may be practiced in other forms of processor such as a digital signal processor, a minicomputer, or a mainframe computer.

In order to permit limited sub-operating system mode code execution within a secure or trusted environment, the sub-operating system mode interrupt may be first directed to a handler in a trusted code module that controls virtual machine access to system resources. This routing of the sub-operating system mode interrupt to the handler may be accomplished by allowing the trusted code to specify the location of the code used to service such a sub-operating system mode interrupt. The sub-operating system mode interrupt will then be directed to sub-operating system mode code, located in another virtual machine monitor domain that is under the security control of the above trusted code, for interrupt servicing. Alternatively, a processor's virtualization architecture may be such that, when trusted code has been established, the sub-operating system mode interrupt will no longer use the normal interrupt service register but will instead cause a transition to the trusted code consistent with the virtualization architecture.

Figures 1, 2:
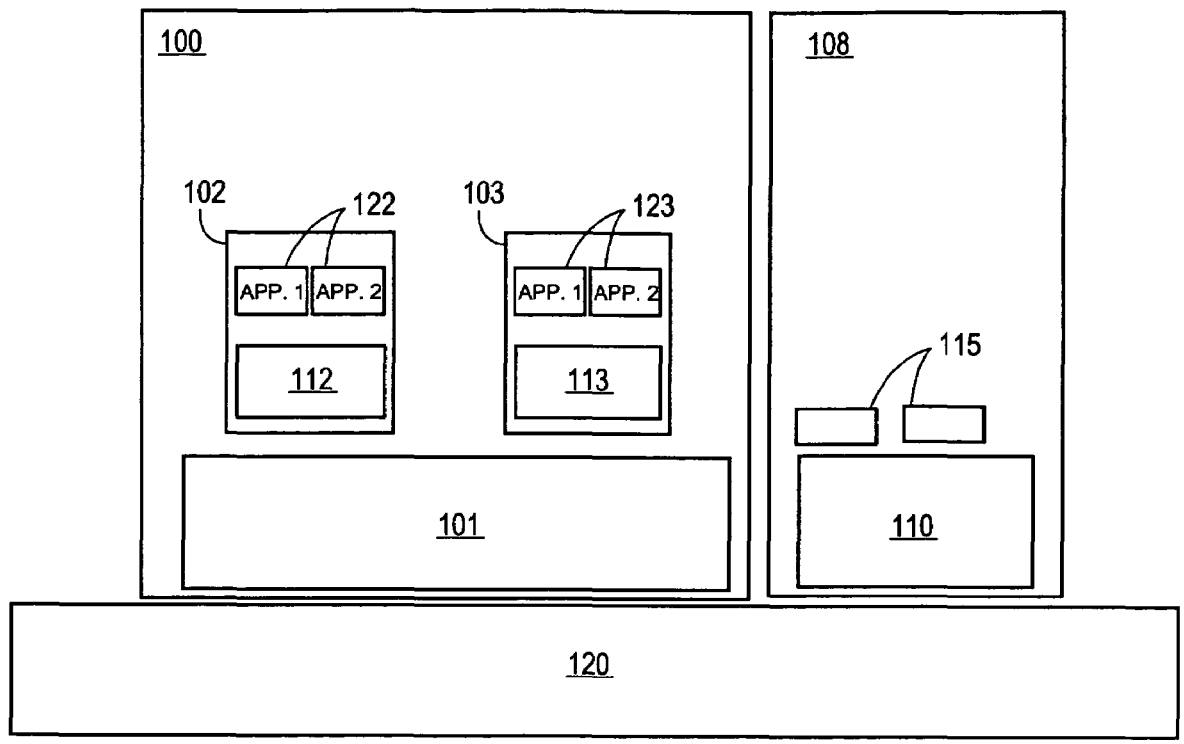
FIG. 1 illustrates a virtual machine environment according to one embodiment of the invention.
FIG. 2 illustrates a VMM domain specifier structure according to one embodiment of the invention.

FIG. 1 illustrates a virtual machine environment, according to one embodiment of the invention. In the virtual machine environment of FIG. 1, one or more virtual machine monitor domains exist, each supporting a virtual machine monitor responsible for handling one or more virtualization events. For purposes of this description, a virtual machine monitor domain (i.e., a "VMM domain") includes at least a single virtual machine monitor which is responsible for handling one or more virtualization events occurring during execution of guest software under its control with respect to those virtualization events. In one embodiment VMM domains are isolated in separate address spaces. In another embodiment, one or more of the VMM domains may be limited in its ability to access memory for another VMM domain. In an embodiment, the VMM domains may run in different modes of operation on the underlying hardware. For example, one VMM domain may operate in sub-operating system mode while another does not.

Particularly, a virtual machine monitor domain 100 contains an MVMM 101 to manage various virtualization events from one or more virtual machines 102 and 103. Though FIG. 1 indicates two virtual machines, there may be one or more such virtual machines. Virtual machines may contain guest operating systems 112 and 113 running applications 122 and 123, respectively, collectively referred to herein as guest software. Virtual machine monitor domain 108 contains an SVMM 110 to manage various virtualization events, such as, in one embodiment, events relating to the sub-operating system mode of the processor, such as sub-operating system mode interrupts. SVMM may support one or more system-specific handling routines 115, which may execute in virtual machine containers.

In the embodiment illustrated in FIG. 1, both virtual machine monitor domains execute on the same processing hardware 120. However, in other embodiments, the virtual machine monitor domains may use different processing hardware. Furthermore, although FIG. 1 illustrates only two virtual machine monitor domains, in other embodiments, more virtual machine monitor domains may exist within the virtual machine environment of FIG. 1.

In one embodiment of the invention, the SVMM is initialized once after one or more guest operating systems (OSs) are booted. In one embodiment, the SVMM is initialized before the guest OSs are booted, whereas in other embodiments, the SVMM is initialized after the guest OSs are booted.

In one embodiment, a platform initialization module, such as, for example, the basic input/output software (BIOS), of the computer system in which the SVMM is running is responsible for specifying information sufficient to invoke the SVMM. In one embodiment of the invention the platform initialization module configures a data structure stored in memory, such as protected memory, to specify information used to invoke the SVMM, including, for example the location in memory in which an SVMM is stored. This data structure is referred to herein as a VMM domain specifier. In one embodiment, the VMM domain specifier can store data used by the processor to initialize the SVMM. The location in memory of the VMM domain specifier can be stored in a processor register or in any other storage location. For example, in one embodiment, the location (i.e., memory address) of a VMM domain specifier is stored in a processor register, such as a machine specific register (MSR), such that the appropriate VMM domain specifer can be used to identify the appropriate SVMM.

FIG. 2 illustrates the format of a VMM domain specifier, according to one embodiment of the invention. The "Byte Offset" column contains the location of each field in relation to the base address of the VMM domain specifier, whereas the "Field" column indicates the particular information stored at each byte offset within the VMM domain specifier. For example, the "VMM Domain specifier revision identifier" is stored at byte offset "0". In other embodiments, the VMM domain specifier may contain more or fewer fields at other byte offsets than those depicted in FIG. 2. In one embodiment, the VMM domain specifier resides in a separate address space accessible only to software running in a special mode and the processor register or other mechanism (e.g., an MSR) used to specify its location to the processor may only be written by software running in a special mode (e.g., by the platform initialization module code running in SMM mode).

Before the SVMM may be used to handle virtualization events, such as, in one embodiment a sub-operating system mode interrupt, the SVMM is initialized in one embodiment of the invention. In one embodiment, the initialization of the SVMM is invoked by the MVMM after it allocates a virtual machine control structure (VMCS) that may be used to handle the initial transition from the MVMM and to the SVMM. As part of its initialization, the SVMM will allocate another VMCS used in subsequent transitions between the SVMM and MVMM domain. In one embodiment, the initialization of the SVMM occurs before an occurrence of any event to be serviced by the SVMM, such as a sub-operating system mode interrupt. However, in other embodiments, the SVMM may be initialized in response to a virtualization event to be serviced by the SVMM, such as a sub-operating system mode interrupt.

Figure 3A:
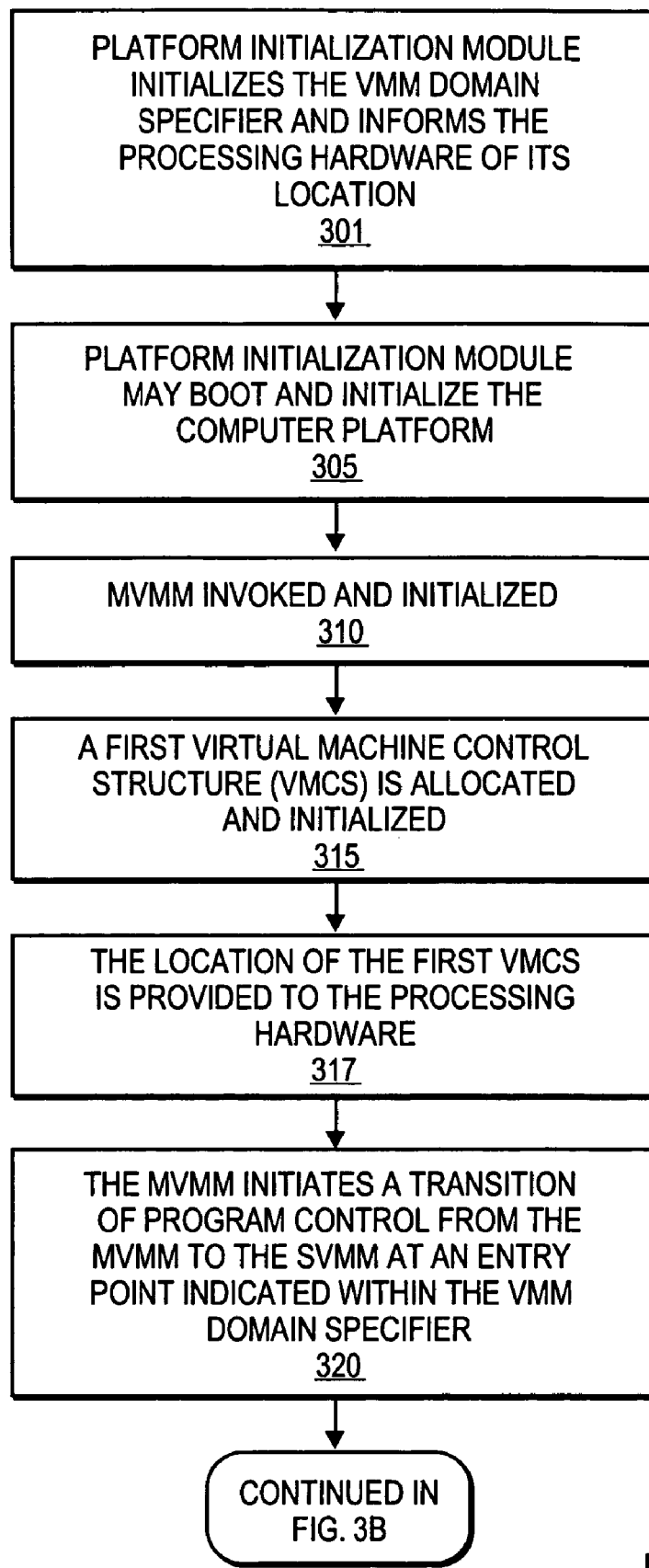
FIG. 3a-3c is a flow diagram illustrating an initialization process according to one embodiment of the invention.
Figure 3B:
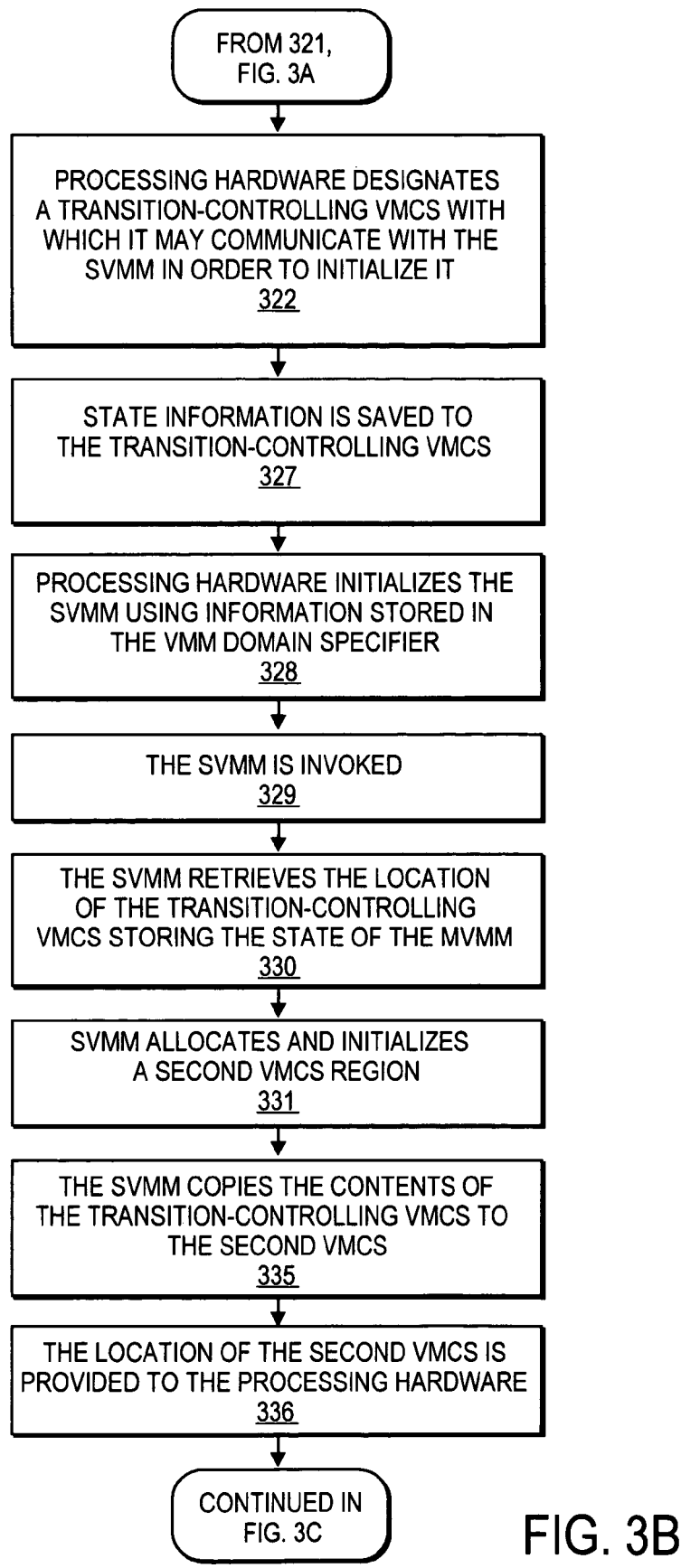
Figure 3C:
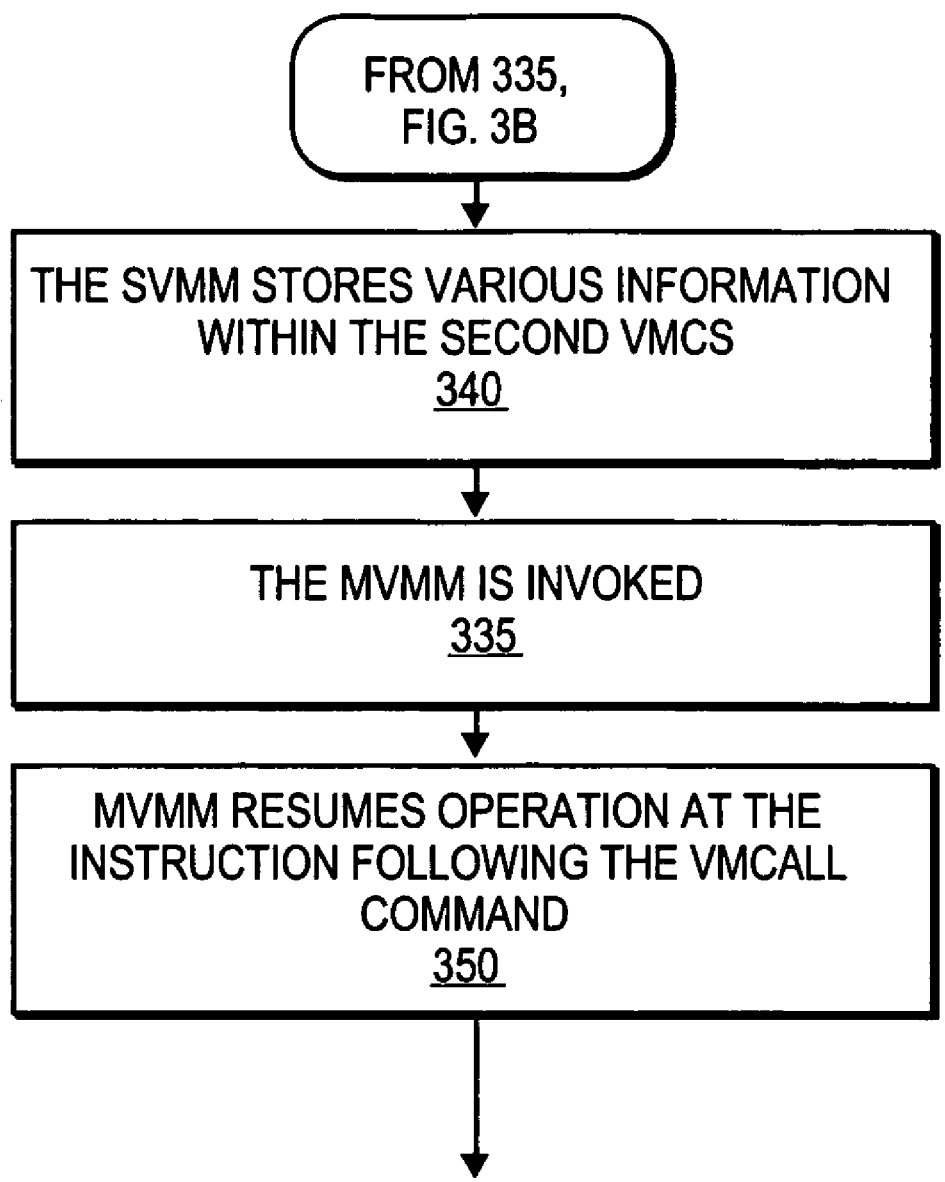

FIG. 3 is a flow diagram illustrating an initialization process of an SVMM according to one embodiment of the invention. At operation 301, the platform initialization module initializes the VMM domain specifier and indicates its location in memory to the processor (e.g., by writing its address to an MSR) to identify the appropriate SVMM. The platform initialization module may boot and initialize the computer platform, at operation 305, according to prior art techniques. An MVMM is invoked and is initialized at operation 310. In one embodiment, the MVMM is invoked and initialized before the guest OS is loaded, whereas in other embodiments the MVMM is invoked and initialized after the guest OS is loaded into main memory (e.g., dynamic random access memory 'DRAM') of the computer system.

In order to initialize the SVMM, at operation 315, a first virtual machine control structure (VMCS) is allocated and initialized by the MVMM to store various state information while transitioning control from the MVMM to the SVMM. From the MVMM's perspective, the first VMCS is its "working" VMCS, to the extent it is used by the MVMM to store information. The MVMM enables the processor to identify the working VMCS through a mechanism specific to the virtualization architecture. For example, in one embodiment, the MVMM executes a specific instruction referred to as a pointer load command (e.g., "VMPTRLD"). In another embodiment, the MVMM may write the pointer value to a processor register or memory location. The processor is informed of the working VMCS in this manner at operation 317 to indicate to the processing hardware the location of the first VMCS.

At operation 320, the MVMM initiates a VM exit in order to cause a transition of program control from the MVMM to the SVMM at an entry point indicated within the VMM domain specifier. In one embodiment, the VM exit occurs by executing an instruction designated for this purpose, referred to herein as "VMCALL". For purposes of discussions herein, the execution of VMCALL may cause a virtualization event.

In one embodiment, the processor initializes the SVMM after detecting the VM exit initiated by the MVMM using the VMCALL instruction, for example. Because the SVMM has not been initialized yet, the processing hardware responds to the VM exit in a different manner than it would if, for example, the VM exit was in response to a virtualization event to be handled by the SVMM such as a sub-operating system mode interrupt. In one embodiment of the invention, the processing hardware designates a VMCS (e.g. "transition-controlling" VMCS) with which it may communicate with the SVMM in order to initialize it at operation 322. For example, in one embodiment, the processing hardware designates the transition-controlling VMCS to be the first VMCS. In order for the processing hardware to record which VMCS was the controlling VMCS before the VM exit occurred, the processing hardware may store a pointer to the pre-transition controlling VMCS ("pre-transition controlling VMCS pointer") within the first VMCS.

To be able to return control to the MVMM at the proper address and with proper machine state within the MVMM after the SVMM is initialized, in one embodiment, the processing hardware may also save the state of the MVMM prior to transitioning control to the SVMM within the transition-controlling VMCS (in this case, the first VMCS). State information is saved to the transition-controlling VMCS (i.e. the first VMCS) at operation 327. The processing hardware initializes the SVMM using information stored in the VMM domain specifier, by forcing particular elements of state to fixed values, or using information from other sources, as will be discussed below, at operation 328.

To locate the VMM domain specifier, the processing hardware may read the associated processor register (e.g., an MSR), which indicates the base address of the VMM domain specifier. In another embodiment, this address may reside in memory or in any other location. In any case, this address is referred to herein as the domain specifier register. In one embodiment, the processing hardware can verify that it has located a proper VMM domain specifier by comparing an identification field located at the base of the VMM domain specifier to the VMM domain specifier revision field stored within the processing hardware. If there is a mismatch, the transition initiated by the VMCALL from the MVMM to the SVMM will fail and control will be returned to the MVMM.

However, if the VMM domain specifier identification fields match, the processing hardware will store information read from the VMM domain specifier into various platform state elements to assist the processor in initializing the SVMM, as will be discussed further below. Platform state elements as discussed herein may include processor registers, values in memory, state in input/output (I/O) devices or the like.

In at least one embodiment, some elements of platform state loaded during the transition form the MVMM to the SVMM during the initialization of the SVMM may be read from the VMM domain specifier, forced to fixed values or left unchanged. FIG. 4 illustrates the handling of various elements of state information during this transition in an example embodiment. Depending on the embodiment, all or some subset of the information stored in the VMM domain specifier is read by the processing hardware and subsequently stored into platform state elements to initialize the SVMM. For example, the value of the selector field of the processor's "CS" segment register is set to the value read from the VMM domain specifier. Other elements of state may be forced to particular values, defined by the processor virtualization architecture. For example, in the example shown in FIG. 4, the "ELFAGS" register may be forced to a fixed value of 0×00000002 (Hex). Other elements of state may be left unchanged. For example, in the example shown in FIG. 4, the value of the "TR" register is unchanged. Some elements of state may have more complex treatment. For example, in one embodiment, portions of the "CR0" register are forced to fixed values while other portions are left unchanged: "PG", "NE", "ET", "MP", and "PE" are all set to 1; "CD" and "NW" are left unchanged; and all other bits are cleared to 0. Some elements of state may be calculated using information from the VMM domain specifier. For example, the "CR3" register may be loaded with a value calculated by adding the VMM domain specifier base address to the value read from the "CR3" offset field from the VMM domain specifier.

In another embodiment, the first VMCS may be allocated and initialized by the platform initialization module. The MVMM therefore does not need to allocate and initialize the VMCS used to initialize the SVMM. The initialization of the SVMM may be initiated by the MVMM executing a command, as described above with regard to FIG. 3. Alternatively, the initialization may be initiated by the first occurrence of a virtualization event. In other embodiments, the initialization of the SVMM may be initiated by the enablement of the virtualization mechanisms of the platform. For example, in one embodiment, the MVMM enables the virtualization support of the processor and platform by executing a specific command referred to herein as "VMXON". At execution of this command processing logic may initialize the SVMM using the platform initialization module provided VMCS. In such embodiments, the VMCS which is the controlling VMCS during operation of the MVMM may be identical to the VMCS used to control the transition returning control from the SVMM to the MVMM following completion of the SVMM initialization (i.e., the post-transition controlling VMCS is the same as the transition-controlling VMCS). Other initialization scenarios are possible and do not limit the scope of the present invention.

After the processing hardware has initialized the SVMM by loading the appropriate platform state elements (as described with regard to FIG. 4), the processing hardware may designate the VMCS that it will use as the controlling VMCS after control is transitioned to the SVMM. In one embodiment, the VMCS used by the processor after control is transitioned to the SVMM ("post-transition controlling VMCS") is the parent VMCS of the transition-controlling VMCS (i.e. the first VMCS).

After the processing hardware has initialized the state of the SVMM, as described with regard to FIG. 4, the SVMM is invoked at a program location designated by an instruction pointer (e.g., the "EIP" register) read from the VMM domain specifier or otherwise calculated as described with regard to FIG. 4 and stored in an appropriate processor control register at operation 329. The initialization code in the SVMM begins execution, at which point, the controlling VMCS is the post-transition controlling VMCS, as described above.

At operation 330, the SVMM initialization code retrieves the location of the first VMCS storing the state of the MVMM. For example, in one embodiment, the SVMM executes a pointer store instruction (e.g., "VMPTRST"). In another embodiment, the SVMM may read this value from a processor register, a memory location or any other location in the platform.

The SVMM allocates and initializes a second VMCS region according to the requirements of the virtualization architecture at operation 331. At operation 335, the SVMM copies the contents of the first VMCS to the second VMCS. At operation 336, the SVMM informs the processor of the location of the second VMCS, as discussed above (e.g., by executing a pointer load instruction) so that the processor is aware of the location of the second VMCS, which is the currently active working VMCS. At operation 340, the SVMM stores various information within the second VMCS, such as host state information, virtual machine entry and exit control codes, a pointer (e.g., "EIP") to the next instruction following the VMCALL command issued from the MVMM, a "clear" state in the VMCS bit controlling entry into the sub-operating system mode, etc.

At operation 335, control is returned to the MVMM. For example, in one embodiment, the SVMM executes an instruction to cause the transition, referred to herein a VM entry instruction, triggering the transition of control. The execution of such an instruction is considered a virtualization event. The second VMCS is used to provide information to assist the transition to the MVMM. In one embodiment, the processor stores a pointer to the second VMCS in an internal register to enable the second VMCS to be used during future transitions to the SVMM when virtualization events requiring service by the SVMM occur. At operation 350, the MVMM resumes operation at the instruction following the VMCALL instruction indicated by the instruction pointer value stored in the second VMCS.

In order to facilitate the initialization and transitions to and from the SVMM, various operations within the processing hardware occur, in one embodiment of the invention. In some embodiments, the processing hardware may use specific circuits and/or logic to perform operations to facilitate transitions to and from the SVMM. However, in other embodiments, these operations may be performed by software. Furthermore, in other embodiments, operations used in conjunction with transitioning to and from the SVMM are performed by a combination of processing hardware and software.

Figure 5A:
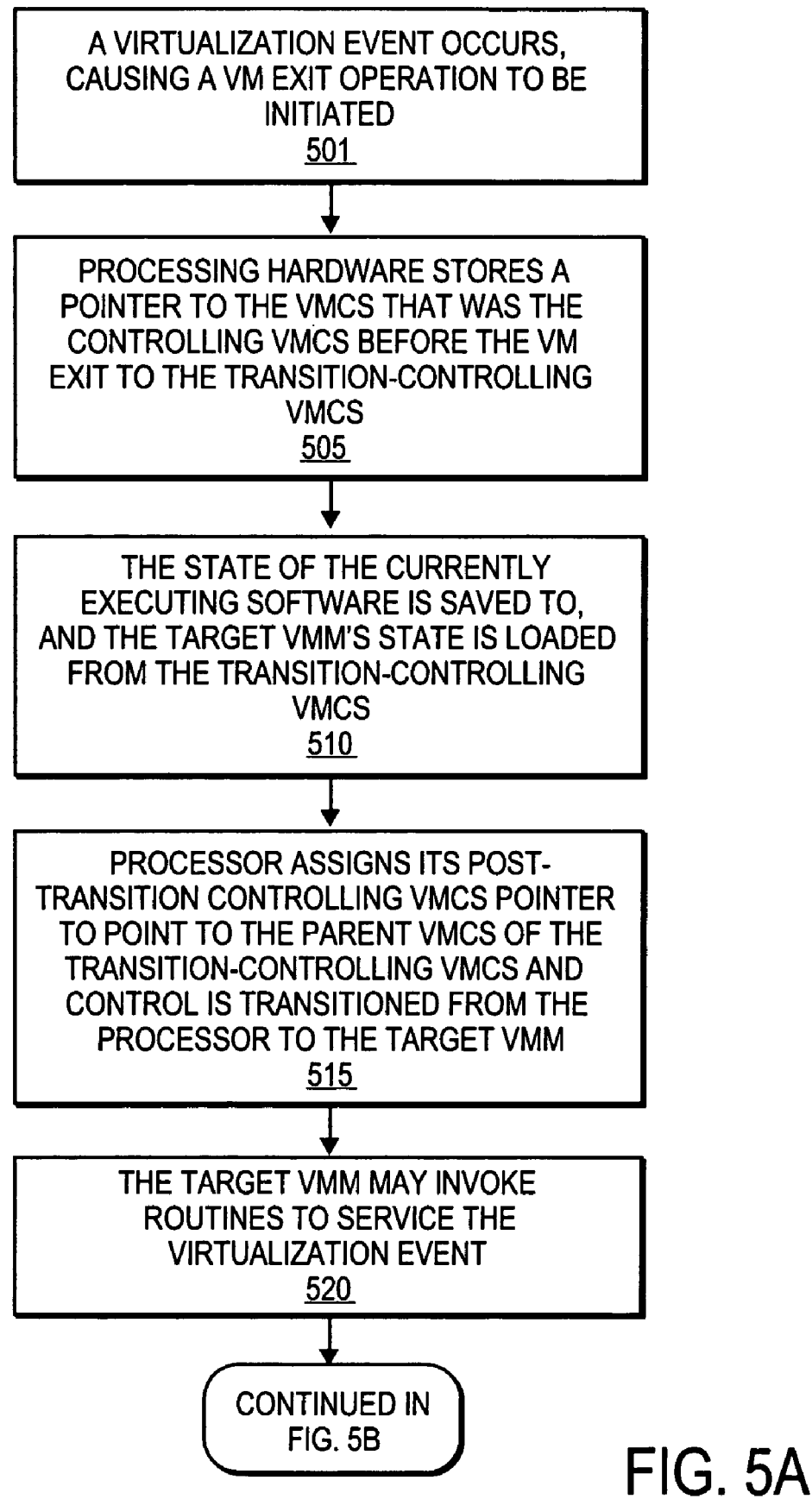
FIG. 5a-5b is a flow diagram illustrating transition between virtual machine monitor domains according to one embodiment of the invention.
Figure 5B:
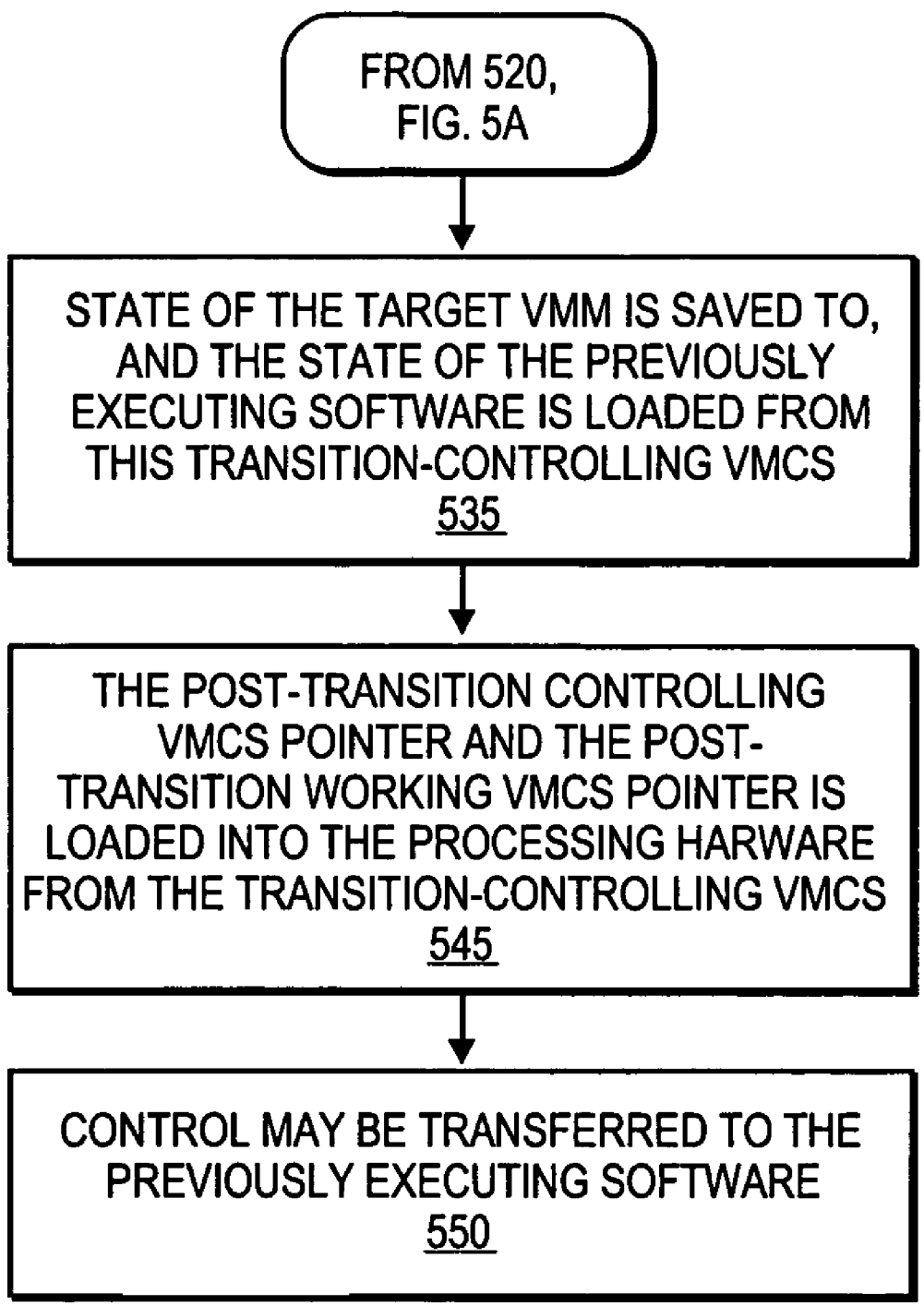

After the SVMM has been initialized, subsequent virtualization events designated to be handled by the SVMM, such as, in one embodiment sub-operating system mode interrupts, may be serviced by the SVMM. FIG. 5 is a flow diagram illustrating an exemplary technique by which a VMM in one VMM domain may service a virtualization event occurring during execution in another VMM domain and return control to the software executing in the original VMM domain, according to one embodiment.

At operation 501 a virtualization event, such as, in one embodiment, a sub-operating system mode interrupt, occurs, causing a VM exit operation to be initiated. In one embodiment, the processor identifies a VMCS to control the transition to the SVMM caused by a particular virtualization event by retrieving a pointer to a VMCS stored within a control register associated with the virtualization event, such as, for example, an "sub-operating system mode VMM domain" register. The processor may read the associated control register to determine the location of the VMCS to be used to control the VM exit. Such a VMCS is referred to herein as a "transition-controlling VMCS". The VMM which will handle the virtualization event is referred to as the "target VMM".

In one embodiment, the processing hardware stores a pointer to the VMCS that was the controlling VMCS before the transition to the SVMM (i.e., the "pre-transition controlling VMCS pointer") to the transition-controlling VMCS (i.e. the SVMM's working VMCS, referred to as the "second" VMCS above) at operation 505. At operation 510, the state of the software that was executing at the time of the occurrence of the virtualization event is saved to, and the state of the target VMM is loaded from the transition-controlling VMCS, or other location, as dictated by the virtualization architecture. At operation 515, the processor assigns its post-transition controlling VMCS pointer to point to the parent VMCS of the transition-controlling VMCS and control is transitioned to the target VMM, at which point, the post-transition controlling VMCS pointer is the controlling VMCS.

After control is transitioned to the target VMM, the target VMM may invoke routines to service the virtualization event at operation 520. In one embodiment, the virtualization event is serviced by handling routines invoked by the target VMM. Furthermore, in some embodiments, the target VMM may create new virtual machines or invoke existing virtual machines to handle the virtualization event. In other embodiments, the virtualization event may be handled by the target VMM directly.

After the virtualization event is serviced, the target VMM may initiate a return of control to the software which was running prior to the occurrence of the virtualization event. This software may be a VMM in another VMM domain, or it may be guest software executing in another VMM domain. In one embodiment, the return of control is initiated by the target VMM by executing a VM entry instruction.

To control the transition from the target VMM to the software which was running prior to the occurrence of the virtualization event, the processing hardware may use the target VMM's working VMCS. This VMCS is referred to herein as the transition-controlling VMCS. In one embodiment, the state of the target VMM is saved to the transition-controlling VMCS. In other embodiments, the state of the target VMM is not saved as part of the transition. The state of the software that was running prior to the occurrence of the virtualization event is loaded from this transition-controlling VMCS (i.e., the target VMM's working VMCS) at operation 535. At operation 545, the post-transition controlling VMCS pointer and the post-transition working VMCS pointer are loaded into the processing hardware from the transition-controlling VMCS (i.e. the target VMM's working VMCS). Control may be transferred to the software which was running prior to the occurrence of the virtualization event at operation 550, at which point the controlling VMCS is the post-transition controlling VMCS and the working VMCS is the post-transition controlling VMCS.

The SVMM or a handling routine called by the SVMM is responsible for responding to the virtualization event, such as, in one embodiment, virtualization events relating to a sub-operating system mode. In one embodiment, because the virtualization event is being serviced by a routine or routines isolated from the MVMM and guest OSs, the service routine cannot access or corrupt the protected resources controlled by the MVMM and the trusted guest OS. After the SVMM has serviced the virtualization event, it can return control to the MVMM or to guest software of the MVMM. The use of untrusted handling routines does not compromise the security of the system because the SVMM is trusted and has capabilities to run the untrusted handling routines in virtual machine containers, preventing them from accessing or otherwise corrupting the state of trusted components in the system.

In one embodiment of the invention, the platform initialization module (e.g., BIOS) may enable or disable the use of the SVMM to service events, such as a sub-operating system mode interrupt, by adjusting a bit or group of bits within the processing hardware. For example, in one embodiment, the platform initialization module may disable the SVMM by setting a "valid" bit within the domain specifier register of one or more processors running a virtual machine. Conversely, the platform initialization module may enable the SVMM by setting the valid bit an opposite value of the value used to disable the SVMM. In other embodiments, the platform initialization module may enable or disable the SVMM using other control bits within a processor running a virtual machine. In an embodiment, the setting of the "valid" bit to disable the SVMM prevents the initialization of the SVMM. In such an embodiment, the mechanism used to initiate the initialization of the SVMM (e.g., the execution of the VMCALL instruction) may fail, indicating to the calling code (e.g., the MVMM) that the facility was disabled by the platform initialization module. In an embodiment, the platform initialization module may be prevented from disabling the SVMM after it is initialized. For example, the "valid" bit may be ignored by the processor after initialization of the SVMM.

Figure 5C:
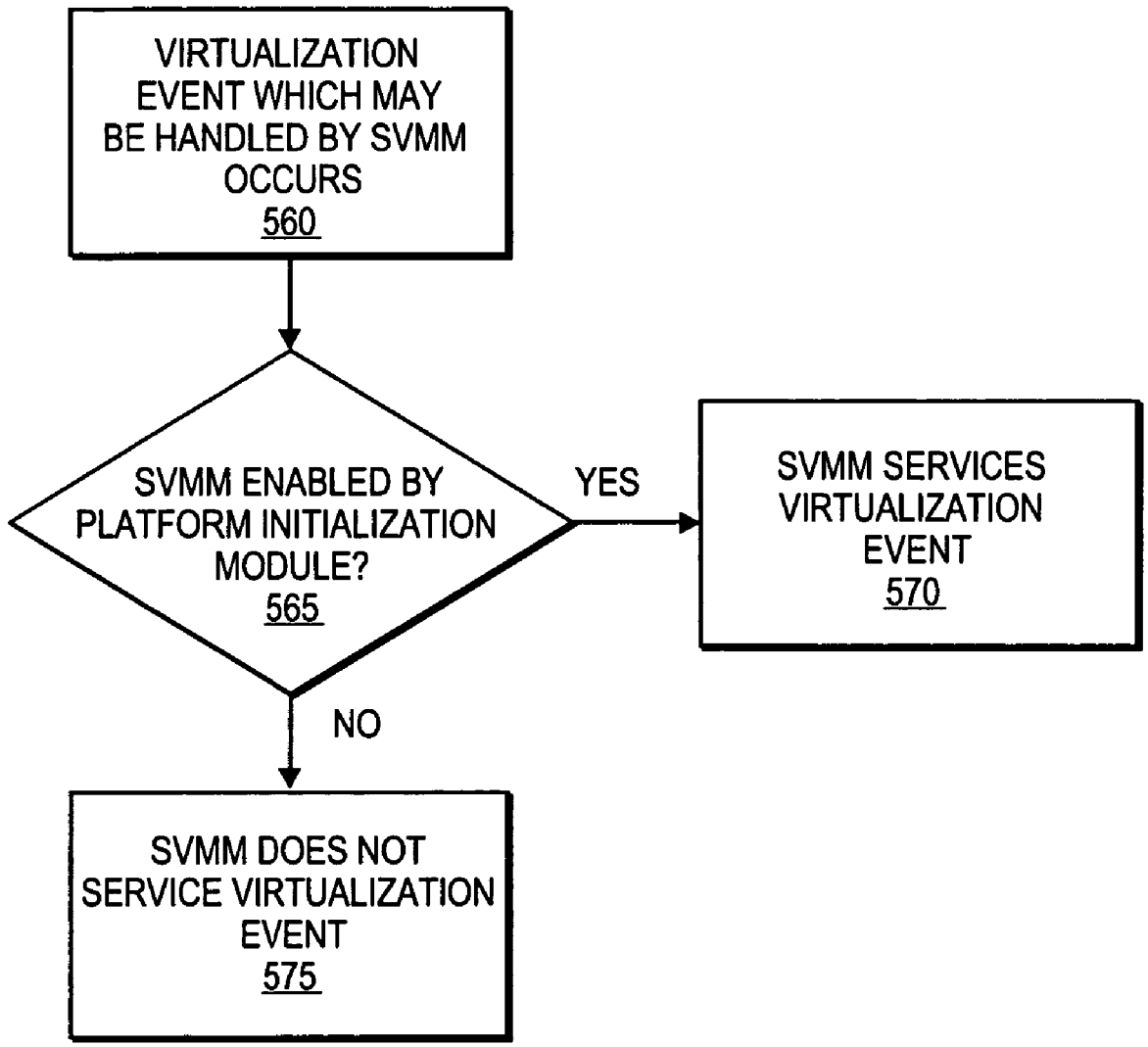
FIG. 5c is a flow diagram illustrating operations to be performed in one embodiment, in which a platform initialization module can enable or disable the SVMM.

FIG. 5c is a flow diagram illustrating operations to be performed in one embodiment, in which the platform initialization module can enable or disable the SVMM. At operation 560, virtualization event that may be handled by the SVMM occurs. If the platform initialization module has enabled the SVMM, at operation 565, then the SVMM will handle the virtualization event at operation 570. However, if the platform initialization module has not enabled the SVMM, then the virtualization will not be handled by the SVMM at operation 575. In one embodiment, the virtualization event is handled by the MVMM if the SVMM is not enabled by platform initialization module when the virtualization event occurs. In other embodiments, the virtualization event may be handled in other ways. For example, in one embodiment, when the virtualization event is a sub-operating system mode interrupt, the event may be handled in the same manner as on platforms without virtualization, interrupting the currently executing task, saving state to a region in memory or other location and vectoring to handling code with, in some embodiments, unrestricted access to platform hardware and memory, as described above.

Figure 6:
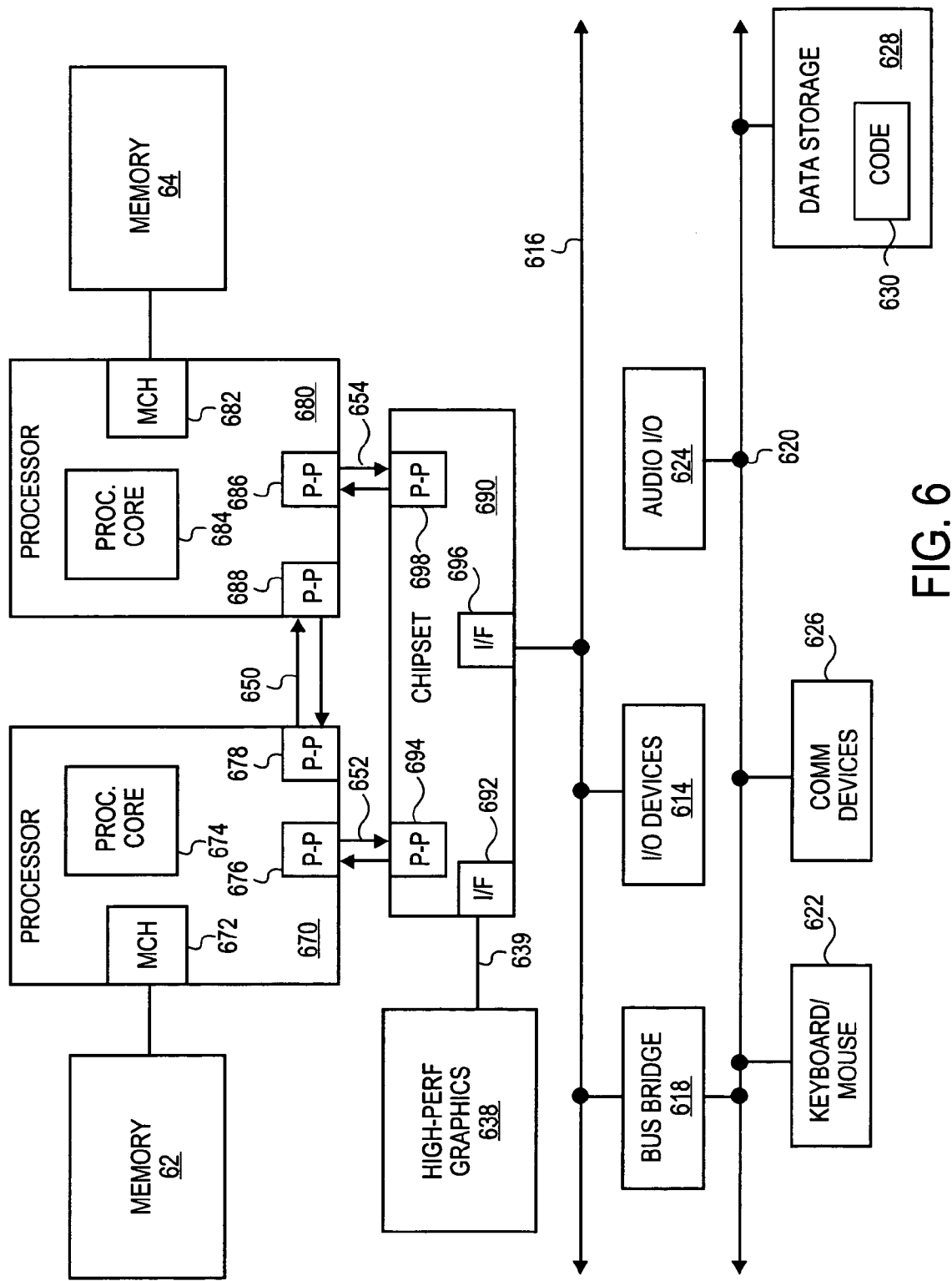
FIG. 6 illustrates a point-to-point computer system in which one embodiment of the invention may be used.

Embodiments of the invention may be used in conjunction with a number of different processing hardware and computer systems. FIG. 6 illustrates a computer system that is arranged in a point-to-point (PtP) configuration. In particular, FIG. 6 shows a system where processors, memory, and input/output devices are interconnected by a number of point-to-point interfaces.

The system of FIG. 6 may also include several processors, of which only two, processors 670, 680 are shown for clarity. Processors 670, 680 may each include a local memory controller hub (MCH) 672, 682 to connect with memory 62, 64. Processors 670, 680 may exchange data via a point-to-point (PtP) interface 650 using PtP interface circuits 678, 688. Processors 670, 680 may each exchange data with a chipset 690 via individual PtP interfaces 652, 654 using point to point interface circuits 676, 694, 686, 698. Chipset 690 may also exchange data with a high-performance graphics circuit 638 via a high-performance graphics interface 639.

At least one embodiment of the invention may be located within the processors 670 and 680. Other embodiments of the invention, however, may exist in other circuits, logic units, or devices within the system of FIG. 6. Furthermore, other embodiments of the invention may be distributed throughout several circuits, logic units, or devices illustrated in FIG. 6.

Figure 7:
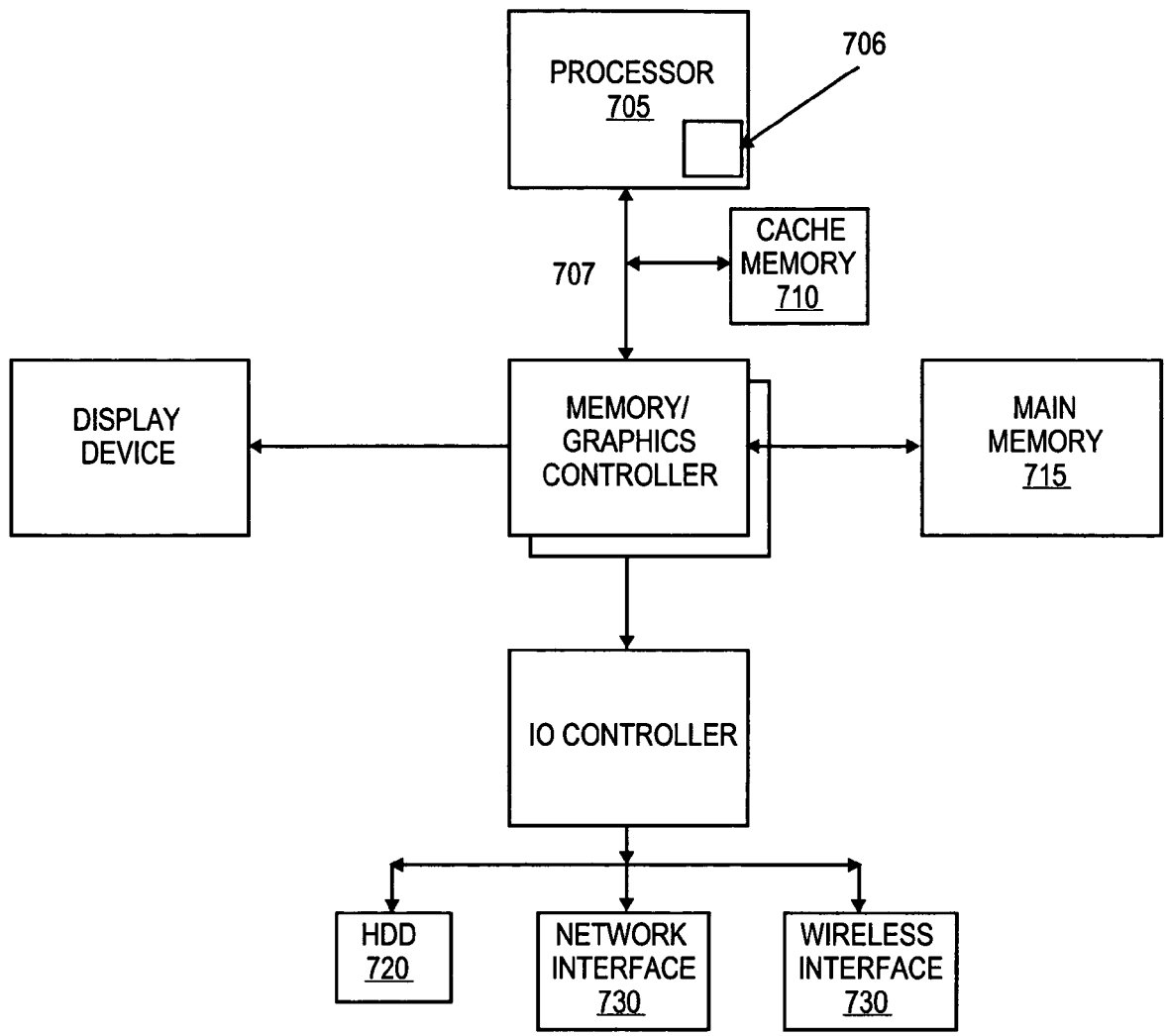
FIG. 7 illustrates a shared bus computer system in which one embodiment of the invention may be used.

FIG. 7 illustrates a front-side-bus (FSB) computer system in which one embodiment of the invention may be used. A processor 705 accesses data from a level one (L1) cache memory 710 and main memory 715. In other embodiments of the invention, the cache memory may be a level two (L2) cache or other memory within a computer system memory hierarchy.

Illustrated within the processor of FIG. 7 is one embodiment of the invention 706, which may be located in other devices or distributed throughout the devices illustrated in FIG. 7. In some embodiments, the processor of FIG. 7 may be a multi-core processor.

The main memory may be implemented in various memory sources, such as dynamic random-access memory (DRAM), a hard disk drive (HDD) 720, or a memory source located remotely from the computer system via network interface 730 containing various storage devices and technologies. The cache memory may be located either within the processor or in close proximity to the processor, such as on the processor's local bus 707. Furthermore, the cache memory may contain relatively fast memory cells, such as a six-transistor (6T) cell, or other memory cell of approximately equal or faster access speed.

While various embodiments disclosed include two or more processors (either logical or physical processors), it should be understood that such multi-processor and/or multi-threaded systems are described in more detail to explain the added complexity associated with securing a system with multiple logical or physical processors. An embodiment also likely to be advantageous in less complex system may use only one processor. In some cases, the one physical processor may be multi-threading and therefore may include multiple logical processors. In other cases, however, a single-processor, single-threaded system may be used, and still utilize the disclosed secure processing techniques. In such cases, the secure processing techniques still operate to reduce the likelihood that data can be stolen or manipulated in an unauthorized manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A computer system comprising:
   a processor to execute a first virtual machine monitor (VMM), and a second VMM, the processor comprising a first storage structure to store a location of a domain specifier of the second VMM; and
   a memory to store a virtual machine control structure (VMCS) including state information pertaining to the first and second VMMs if a transition between the first and the second VMMs occurs;
   wherein the second VMM is to be provided with a pointer to the VMCS after program control has been transitioned to the second VMM.

2. The computer system of claim 1 wherein the first VMM is to service only non-sub-operating system mode virtualization events and the second VMM is to service sub-operating system mode virtualization events.

3. The computer system of claim 1, wherein the second VMM is to be initialized in response to one of the first VMM issuing a command and a first occurrence of a virtualization event to be managed by the second VMM.

4. A processor comprising:
   a storage structure to store initialization information when transitioning program control from a first virtual machine monitor domain comprising a first virtual machine monitor (VMM) and guest software to a second VMM executing in a second virtual machine monitor domain due to a virtualization event, the initialization information initialize the second VMM, the initialization information including a first pointer to a pre-transition controlling virtual machine control structure (VMCS) which controls execution of the first virtual machine monitor domain prior to transitioning control to the second VMM and a second pointer to a post-transition controlling VMCS which controls execution of the second virtual machine monitor domain after transitioning control to the second VMM.

5. The processor of claim 4, wherein if the second VMM has completed servicing the virtualization event, control is to be transitioned from the second VMM to the first virtual machine monitor domain.

6. The processor of claim 5, wherein the transition from the second VMM to the first virtual machine monitor domain returns control to one of the first VMM or the guest software.

7. The processor of claim 6 wherein the initialization information comprises a pointer to a transition-controlling VMCS, through which the processor accesses state information of software executing in the first virtual machine monitor domain while control is transitioning from the second VMM.

8. The processor of claim 7 wherein the initialization information comprises a pointer to a post-transition controlling VMCS, which controls execution after control has transitioned from the second VMM.

* * * * *

UNITED STATES PATENT AND TRADEMARK OFFICE
CERTIFICATE OF CORRECTION

PATENT NO. : 7,581,219 B2  Page 1 of 1
APPLICATION NO. : 11/095855
DATED : August 25, 2009
INVENTOR(S) : Neiger et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 724 days.

Signed and Sealed this

Fourteenth Day of September, 2010

David J. Kappos
*Director of the United States Patent and Trademark Office*